United States Patent
Suekane et al.

(10) Patent No.: US 6,309,765 B1
(45) Date of Patent: Oct. 30, 2001

(54) MAGNETIC RECORDING MEDIUM AND PROCESS FOR ITS PRODUCTION

(75) Inventors: Michinobu Suekane; Makoto Imakawa; Takehiko Hiruma; Kazuhiko Mitarai, all of Yonezawa (JP)

(73) Assignee: Asahi Komag Co., Ltd., Tokyo (JP)

( * ) Notice: Subject to any disclaimer, the term of this patent is extended or adjusted under 35 U.S.C. 154(b) by 0 days.

(21) Appl. No.: 09/262,006

(22) Filed: Mar. 4, 1999

(30) Foreign Application Priority Data

Mar. 25, 1996 (JP) .................................................. 10-077936

(51) Int. Cl.$^7$ ........................................................ G11B 5/66
(52) U.S. Cl. ............................ 428/694 TS; 428/694 TM; 428/900; 427/178; 427/129; 427/130; 204/192.2
(58) Field of Search ..................... 428/694 TS, 694 TM, 428/900; 427/128–130; 204/192.2

(56) References Cited

U.S. PATENT DOCUMENTS

| 5,693,426 | 12/1997 | Lee et al. | 428/611 |
| 5,846,648 | 12/1998 | Chen et al. | 428/332 |
| 6,077,603 | * 6/2000 | Zhang | 428/332 |
| 6,110,582 | * 8/2000 | Wu | 428/332 |
| 6,117,570 | * 9/2000 | Chen | 428/694 T |

FOREIGN PATENT DOCUMENTS 0 704 839   4/1996   (EP) .

OTHER PUBLICATIONS

Li–Lien Lee, et al., "NiAl Underlayers For CoCrTa Magnetic Thin Films," IEEE Transactions on Magnetics, vol. 30, No. 6, (Nov. 1994), pp. 3951–3953.

* cited by examiner

Primary Examiner—Leszek Kiliman
(74) Attorney, Agent, or Firm—Oblon, Spivak, McClelland, Maier & Neustadt, P.C.

(57) ABSTRACT

A magnetic recording medium comprising a non-ferromagnetic substrate and a magnetic recording layer formed on the substrate with an underlayer of Cr or a Cr alloy interposed therebetween, which has a seed layer between the substrate and the underlayer, wherein said seed layer is made of a material which contains at least 30 ppm of oxygen and which has a B2 crystal structure.

9 Claims, 1 Drawing Sheet

MAGNETIC RECORDING MEDIUM AND PROCESS FOR ITS PRODUCTION

BACKGROUND OF THE INVENTION

1. Field of the Invention

The present invention relates to a magnetic recording medium suitable as a recording medium for a hard disc device and a process for producing it.

2. Discussion of Background

In recent years, magnetic recording media have been developed for high density recording. Accordingly, a medium having a low noise and being excellent in S/N, is required. Heretofore, as a means to obtain high coercive force, it has been reported to employ NiAl having B2 structure as a seed layer (IEEE TRANSACTIONS ON MAGNETICS, vol.30, pp3951–3953, No. 6, 1994, EP 0704839A1).

However, no mention is made in such a report about a change of the noise characteristics of a medium depending upon the oxygen content of the seed layer.

SUMMARY OF THE INVENTION

It is an object of the present invention to provide a magnetic recording medium having a noise substantially reduced and being capable of high density recording, by selecting the oxygen content of a seed layer, and a process for its production.

The present invention has been made to accomplish the above object and provides a magnetic recording medium comprising a non-ferromagnetic substrate and a magnetic recording layer formed on the substrate with an underlayer of Cr or a Cr alloy interposed therebetween, which has a seed layer between the substrate and the underlayer, wherein said seed layer is made of a material which contains at least 30 ppm of oxygen and which has a B2 crystal structure.

DETAILED DESCRIPTION OF THE PREFERRED EMBODIMENTS

Figure 1:
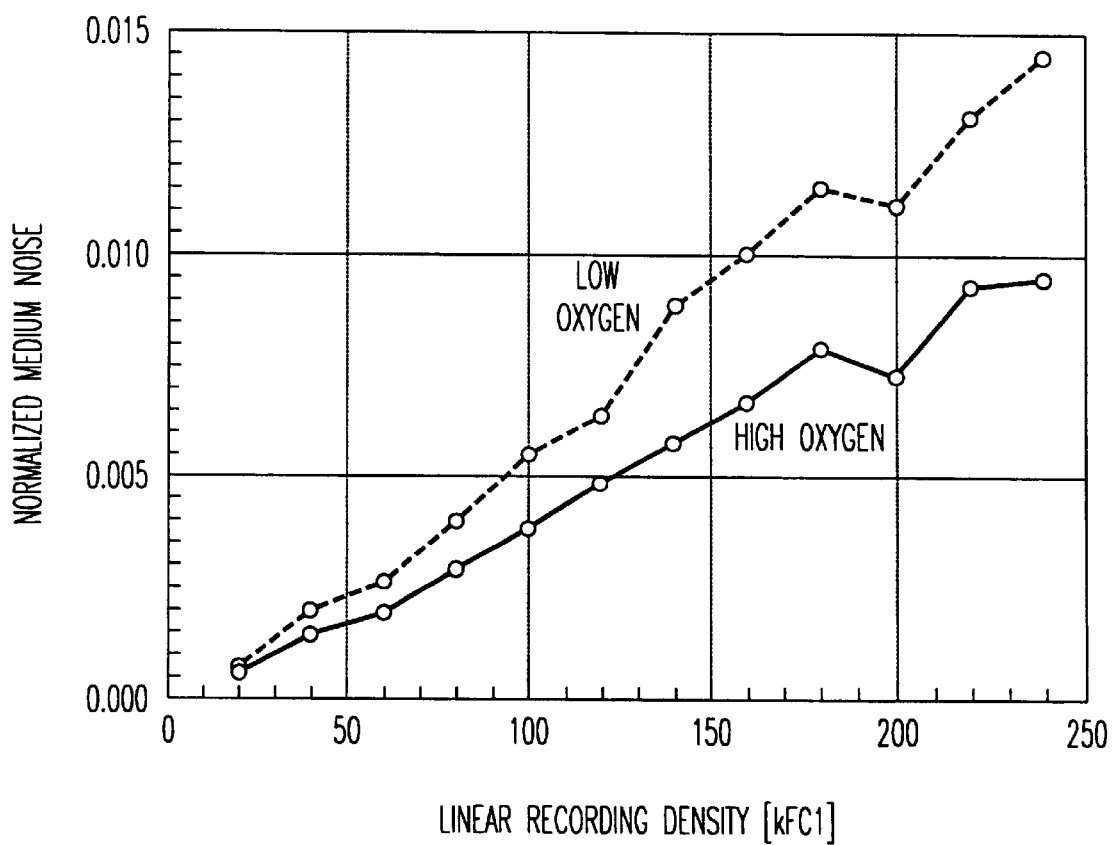
FIG. 1 is a graph showing the relation between the linear recording density and the normalized medium noise in an Example and a Comparative Example.

In the present invention, the oxygen content ppm in the seed layer is a weight ratio of oxygen in the seed layer containing oxygen (the same applies hereinafter).

The seed layer preferably contains at most 500 ppm of oxygen.

More preferably, the seed layer contains from 100 to 350 ppm of oxygen.

The seed layer is preferably made of a material which is selected from the group consisting of NiAl, NiAlRu, NiAlNd, NiAlCr, NiAlPt and NiAlPd and which has a B2 crystal structure.

Further, the present invention provides a process for producing a magnetic recording medium, which comprises forming a seed layer which contains at least 30 ppm of oxygen and which has a B2 crystal structure, on a non-ferromagnetic substrate by a sputtering method by means of a target which has a B2 crystal structure and which has an oxygen content of at least 100 ppm, and then forming an underlayer of Cr or a Cr alloy and a magnetic recording layer sequentially.

In the present invention, the substrate is made of a non-ferromagnetic material and can be selected from e.g. one made of glass, one having such a glass substrate subjected to reinforcing treatment and one made of crystallized glass. However, it may be selected from other non-ferromagnetic materials such as aluminum, titanium and carbon-type material, so long as the purpose and effects of the present invention will not thereby be impaired.

In the present invention, the underlayer for the magnetic recording layer is made of Cr or a Cr alloy. The Cr alloy may, for example, be CrMo, CrW, CrTi, CrV or CrMn.

In the present invention, the content of oxygen in the seed layer is at least 30 ppm, preferably at least 50 ppm, and it is usually at most 500 ppm, particularly preferably from 100 to 350 ppm, although it is selected taking into consideration various properties of the magnetic recording medium, the target and the sputtering conditions, to accomplish the object of the present invention. If the content of oxygen is less than 30 ppm, the function as a seed layer to accomplish the object of the present invention, tends to be hardly obtainable.

The oxygen content in the target having B2 crystal structure is required to be at a level to present the required oxygen content to the seed layer to accomplish the object of the present invention. Namely, the weight ratio of oxygen in the target is usually at least 100 ppm, preferably at most 5,000 ppm, particularly preferably from 800 to 3,500 ppm. If the oxygen content in a NiAl target is too much, an oxide of NiAl tends to form so much that particles of the oxide are likely to form in the sputtering chamber, or an oxide of NiAl is likely to accumulate on the target surface thus leading to abnormal discharge, such being undesirable.

As the above target, it is possible to employ, other than NiAl, a material having B2 crystal structure selected from the consisting of NiAlRu, NiAlNd, NiAlCr, NiAlPt and NiAlPd. With these materials, if the oxygen content is too much, similar problems are likely to result, such being undesirable.

In the present invention, the magnetic recording layer is made of an alloy which comprises Co as the main component and at least Cr and Pt. It may further contain at least one member selected from the group consisting of Ta, Mo, W, Nb, V, Zr, B and Ti.

A protective layer and a lubricating layer may further be formed on the magnetic recording layer of an assembly comprising the substrate, the seed layer, the underlayer and the magnetic recording layer, to obtain the magnetic recording medium of the present invention. As the protective layer, a carbon-type material may, for example, be employed, and as the lubricating layer, a lubricant of a perfluoropolyether type may, for example, be employed.

Now, the function of the seed layer will be described with reference to a NiAl seed layer.

From the viewpoint of crystallographic orientation, the lattice constant of NiAl(110) of the NiAl seed layer is nearly equal to the lattice constant of Cr(110). Accordingly, the Cr underlayer grows epitaxially on the NiAl seed layer to exhibit Cr(110) orientation. Further, the lattice constants of Cr(110) and Co(100) are nearly equal to each other. Accordingly, in the Co alloy on the Cr underlayer, Co(100) orientation preferentially proceeds, and C axis will be oriented in plane.

From the viewpoint of the crystal grain size, NiAl tends to hardly undergo grain growth at a substrate temperature of from 200 to 250° C. during the film formation of NiAl, since NiAl is a high melting point metal having a melting point of 1,683° C. Further, as shown by the present invention, in a case where the amount of oxygen contained in the NiAl target exceeds a certain level and is not excessive, a suitable amount of an oxide of NiAl will be formed, and this oxide will be taken into a film formed by sputtering, whereby the grain growth of the NiAl layer will be suppressed to a proper level, and thus, the grain growth in the magnetic recording layer and the Cr underlayer which grows epitaxially on the NiAl layer, will be properly suppressed. It is considered that as a result, properly fine magnetic grains will be formed in the magnetic recording layer, whereby the media noise will be reduced. A similar function is considered to be obtainable also in a case where an underlayer made of a Cr alloy is employed or in a case of a seed layer made of the above-mentioned material other than NiAl.

Now, the present invention will be described in further detail with reference to Examples. However, it should be understood that the present invention is by no means restricted to such specific Examples.

EXAMPLE 1

A sputtering chamber was evacuated to a base pressure of $1 \times 10^{-6}$ Torr, and then film forming was carried out as described below in an Ar atmosphere of 6 m Torr at a substrate temperature of 200° C. without applying a substrate bias.

On a non-ferromagnetic substrate made of aluminosilicate glass, by a magnetron sputtering method, a NiAl layer (thickness: 500 Å) was firstly formed as a seed layer by means of a $Ni_{50}Al_{50}$ target having B2 structure containing 2,900 ppm of oxygen, and then a Cr layer (thickness: 100 Å) was formed as an underlayer. Then, a magnetic layer made of $Co_{75}Cr_{15}Ta_5Pt_5$ was formed in a thickness of 250 Å thereon, and a carbon type protective layer and a lubricating layer were further formed thereon to obtain a test sample of Example 1 (the amounts of components in the compositional formula are represented by atomic %). The above NiAl seed layer was identified to be NiAl of B2 crystal structure having a composition of $Ni_{50}Al_{50}$ by the X-ray diffraction. The oxygen content was measured by a SIMS method (Secondary Ion Mass Spectroscopy Analysis) and was found to be about 260 ppm.

Further, in a similar manner, on a non-ferromagnetic substrate made of aluminosilicate glass, a NiAl layer (thickness: 500 Å) was formed as a seed layer by means of a $Ni_{50}Al_{50}$ target having B2 structure containing 50 ppm of oxygen, and then, a Cr layer (thickness: 100 Å) was formed as an underlayer. Then, a magnetic layer made of $Co_{75}Cr_{15}Ta_5Pt_5$ was formed thereon in a thickness of 250 Å, and a carbon type protective layer and a lubricating layer were further formed thereon to obtain a test sample of Comparative Example 1. The above seed layer was identified to be NiAl of B2 structure having a composition of $Ni_{50}Al_{50}$ by the X-ray diffraction. The oxygen content was measured by the SIMS method and found to be about 5 ppm.

FIG. 1 shows the measured values of the linear recording densities and the normalized medium noises in cases where the above $Ni_{50}Al_{50}$ target having an oxygen content of 2,900 ppm (high oxygen) was employed (the oxygen content in the seed layer: about 260 ppm) and where the above $Ni_{50}Al_{50}$ target having an oxygen content of 50 ppm (low oxygen) was employed (oxygen content in the seed layer: about 5 ppm). The abscissa represents the magnetic flux change per inch$\times 10^3$ (kFCI). The ordinate represents a value of a noise portion of an output at each frequency as normalized by a signal portion of an output at 20 kFCI in order to cancel out the difference in Mrt (remanent magnetization thickness product), as measured by means of a read write tester manufactured by GUZIK Technical Enterprises and a spectrum analyzer manufactured by Hewlett Packard Co. (HP Co.).

FIG. 1 shows that the normalized noise of the medium having a seed layer of B2 crystal structure having a high oxygen content (oxygen content: about 260 ppm) is reduced over the entire range of the linear recording density of the medium measured, as compared with the medium having a seed layer having a low oxygen content (oxygen content: about 5 ppm).

EXAMPLE 2

A sputtering chamber was evacuated to a base pressure degree of $1 \times 10^{-6}$ Torr, and then film forming was carried out as described below in an Ar atmosphere of 6 m Torr at a substrate temperature of 200° C. without applying a substrate bias.

On a non-ferromagnetic substrate made of aluminosilicate glass, a NiAl layer (thickness: 500 Å) was firstly formed as a seed layer by means of a $Ni_{50}Al_{50}$ target having B2 structure containing 2,900 ppm of oxygen, and then a $Cr_{85}Mo_{15}$ layer (thickness: 100 Å) was formed as an underlayer. Then, a magnetic layer made of $Co_{72}Cr_{20}Pt_8$ was formed thereon in a thickness of 250 Å, and a carbon type protective layer and a lubricating layer were further formed thereon to obtain a test sample of Example 2. The above NiAl seed layer was identified to be $Ni_{50}Al_{50}$ of B2 structure by the X-ray diffraction. The oxygen content was measured by a SIMS method and found to be about 260 ppm.

Further, in a similar manner, on a non-ferromagnetic substrate made of aluminosilicate glass, a NiAl layer (thickness: 500 Å) was formed as a seed layer by means of a $Ni_{50}Al_{50}$ target having B2 structure containing 50 ppm of oxygen, and then a $Cr_{85}Mo_{15}$ layer (thickness: 100 Å) was formed as an underlayer. Then, a magnetic layer made of $Co_{72}Cr_{20}Pt_8$ was formed thereon in a thickness of 250 Å, and a carbon type protective layer and a lubricating layer were further formed thereon to obtain a test sample of Comparative Example 2.

The above NiAl seed layer was identified to be $Ni_{50}Al_{50}$ of B2 structure by the X-ray diffraction. The oxygen content was measured by a SIMS method and found to be about 5 ppm.

The read/write performance of these test samples is shown in Table 1. Here, the resolution is the ratio of the signal output at 165 kFCI to the signal output at 42 kFCI, PW50 is the pulse width at 50% of pulse amplitude, O/W is the overwriting property, Nmedia is the media noise, S/Nt is a signal to total noise ratio, and S/Nm is a signal to media noise ratio.

TABLE 1

|  | Resolution (%) | PW50 (nsec.) | O/W (-dB) | Nmedia (mV$^2$) | S/Nt (dB) | S/Nm (dB) |
| --- | --- | --- | --- | --- | --- | --- |
| Ex. 2 | 39.51 | 19.94 | 40.85 | 39.39 | 14.44 | 16.49 |
| Comp. Ex. 2 | 37.68 | 21.25 | 37.12 | 46.76 | 13.31 | 16.20 |

With respect to the read/write performance of Example 2, the resolution is improved, and the media noise (Nmedia) is low as compared with Comparative Example 2. As a result, it is evident that the magnetic recording medium of the present invention is an excellent medium having Nmedia, S/Nm and S/Nt remarkably improved.

Further, it is evident that also with respect to PW50 and O/W, Example 2 of the present invention is an excellent medium as compared with Comparative Example 2.

EXAMPLE 3

A sputtering chamber was evacuated to a base pressure of $1 \times 10^{-6}$ Torr, and then film forming was carried out as described below in an Ar atmosphere of 6 m Torr at a substrate temperature of 200° C. without applying a substrate bias.

On a non-ferromagnetic substrate made of aluminosilicate glass, a NiAl layer (thickness: 500 Å) was firstly formed as a seed layer by means of a $Ni_{50}Al_{50}$ target having B2 structure containing 2,900 ppm of oxygen, and then a $Cr_{80}Mo_{20}$ layer (thickness: 100 Å) was formed as an underlayer. Then, a magnetic layer of $Co_{68}Cr_{21}Ta_1Pt_{10}$ was formed in a thickness of 250 Å, and a carbon type protective layer and a lubricating layer were further formed thereon to obtain a test sample of Example 3. The above NiAl layer was identified to be $Ni_{50}Al_{50}$ of B2 structure by the X-ray diffraction. The oxygen content was measured by a SIMS method and was found to be about 260 ppm.

Further, in a similar manner, on a non-ferromagnetic substrate made of aluminosilicate glass, a NiAl layer (thickness: 500 Å) was formed by means of a $Ni_{50}Al_{50}$ target having B2 structure containing 80 ppm of oxygen, and then a $Cr_{80}Mo_{20}$ layer (thickness: 100 Å) was formed as an underlayer. Then, a magnetic layer made of $Co_{68}Cr_{21}Ta_1Pt_{10}$ was formed thereon in a thickness of 250 Å, and a carbon type protective layer and a lubricating layer were further formed thereon to obtain a test sample of Comparative Example 3.

The above NiAl seed layer was identified to be $Ni_{50}Al_{50}$ of B2 structure by the X-ray diffraction. The oxygen content was measured by a SIMS method and found to be about 25 ppm. The read/write performance of these test samples is shown in Table 2.

TABLE 2

|  | Resolution (%) | PW50 (nsec.) | O/W (−dB) | Nmedia ($mV^2$) | S/Nt (dB) | S/Nm (dB) |
| --- | --- | --- | --- | --- | --- | --- |
| Ex. 3 | 59.3 | 14.6 | 46.1 | 9.13 | 18.2 | 21.8 |
| Comp. Ex. 3 | 58.7 | 15.6 | 43.3 | 12.46 | 17.8 | 20.7 |

With respect to the read/write performance of Example 3, the resolution performance is improved, and the media noise (Nmedia) is low as compared with Comparative Example 3. As a result, it is evident that the magnetic recording medium of the present invention is an excellent medium having Nmedia, S/Nm and S/Nt remarkably improved.

Further, it is evident that also with respect to PW50 and O/W, Example 3 of the present invention is an excellent medium as compared with Comparative Example 3.

The magnetic recording medium of the present invention has an excellent characteristic such that the media noise is remarkably reduced over a wide range of the recording density, by forming a seed layer made of a material having an oxygen content of at least 30 ppm and a B2 crystal structure between a non-ferromagnetic substrate and a Cr or Cr alloy underlayer.

Further, the magnetic recording medium of the present invention has excellent PW50 and O/W characteristics.

What is claimed is:

1. A magnetic recording medium comprising a non-ferromagnetic substrate and a magnetic recording layer formed on the substrate with an underlayer of Cr or a Cr alloy interposed therebetween, which has a seed layer between the substrate and the underlayer, wherein said seed layer is made of a material which contains at least 30 ppm of oxygen and which has a B2 crystal structure.

2. The magnetic recording medium according to claim 1, wherein the seed layer is made of a material which contains at least 50 ppm of oxygen and which has a B2 crystal structure.

3. The magnetic recording medium according to claim 1, wherein the seed layer is made of a material which contains at most 500 ppm of oxygen and which has a B2 crystal structure.

4. The magnetic recording medium according to claim 1, wherein the seed layer is made of a material which contains from 100 to 350 ppm of oxygen and which has a B2 crystal structure.

5. The magnetic recording medium according to claim 1, wherein the seed layer is made of a material which is selected from the group consisting of NiAl, NiAlRu, NiAlNd, NiAlCr, NiAlPt and NiAlPd and which has a B2 crystal structure.

6. A process for producing a magnetic recording medium, which comprises forming a seed layer which contains at least 30 ppm of oxygen and which has a B2 crystal structure, on a non-ferromagnetic substrate by a sputtering method by means of a target which has a B2 crystal structure and which has an oxygen content of at least 100 ppm, and then forming an underlayer of Cr or a Cr alloy and a magnetic recording layer sequentially.

7. The process for producing a magnetic recording medium according to claim 6, wherein the oxygen content of the target having the B2 structure is at most 5,000 ppm.

8. The process for producing a magnetic recording medium according to claim 6, wherein the oxygen content of the target having the B2 structure is from 800 to 3,500 ppm.

9. The process for producing a magnetic recording medium according to claim 6, wherein the target is made of a material which is selected from the group consisting of NiAl, NiAlRu, NiAlNd, NiAlCr, NiAlPt and NiAlPd and which has a B2 crystal structure.

* * * * *

UNITED STATES PATENT AND TRADEMARK OFFICE
CERTIFICATE OF CORRECTION

PATENT NO.   : 6,309,765 B1  
DATED        : October 30, 2001  
INVENTOR(S)  : Suekane et al.

Page 1 of 1

It is certified that error appears in the above-identified patent and that said Letters Patent is hereby corrected as shown below:

<u>Title page,</u>
Item [30], the Foreign Application Priority information should read:

-- [30]     Foreign Application Priority Data
Mar. 25, 1998   (JP) ..........................................10-077936 --

Signed and Sealed this

Seventh Day of May, 2002

Attest:

JAMES E. ROGAN
*Attesting Officer*   *Director of the United States Patent and Trademark Office*